No. 760,760. PATENTED MAY 24, 1904.
J. A. RUSSELL.
MACHINE FOR CUTTING MANTLES FOR INCANDESCENT LIGHTS
OR OTHER MATERIAL.
APPLICATION FILED FEB. 11, 1903.
NO MODEL. 5 SHEETS—SHEET 1.
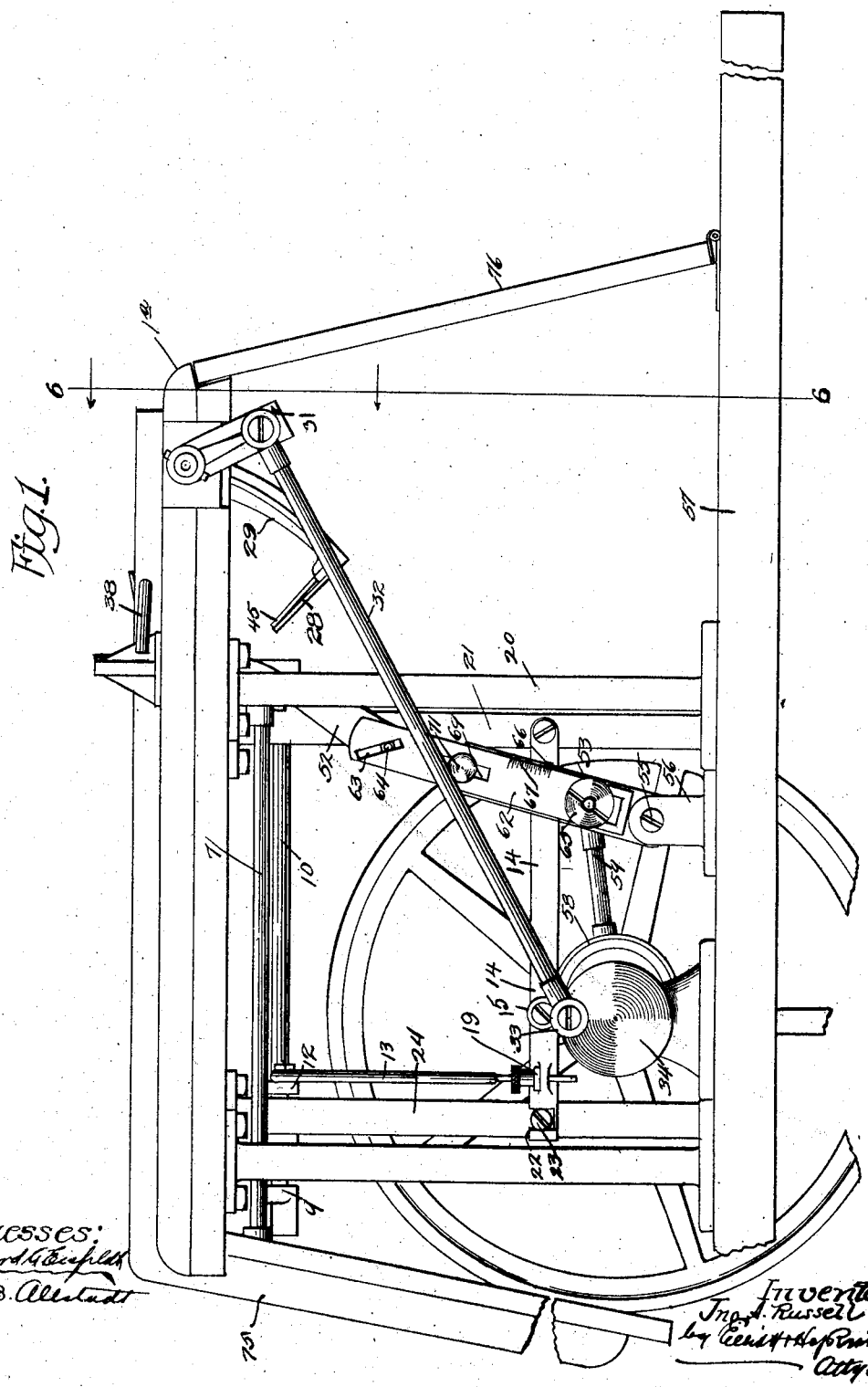

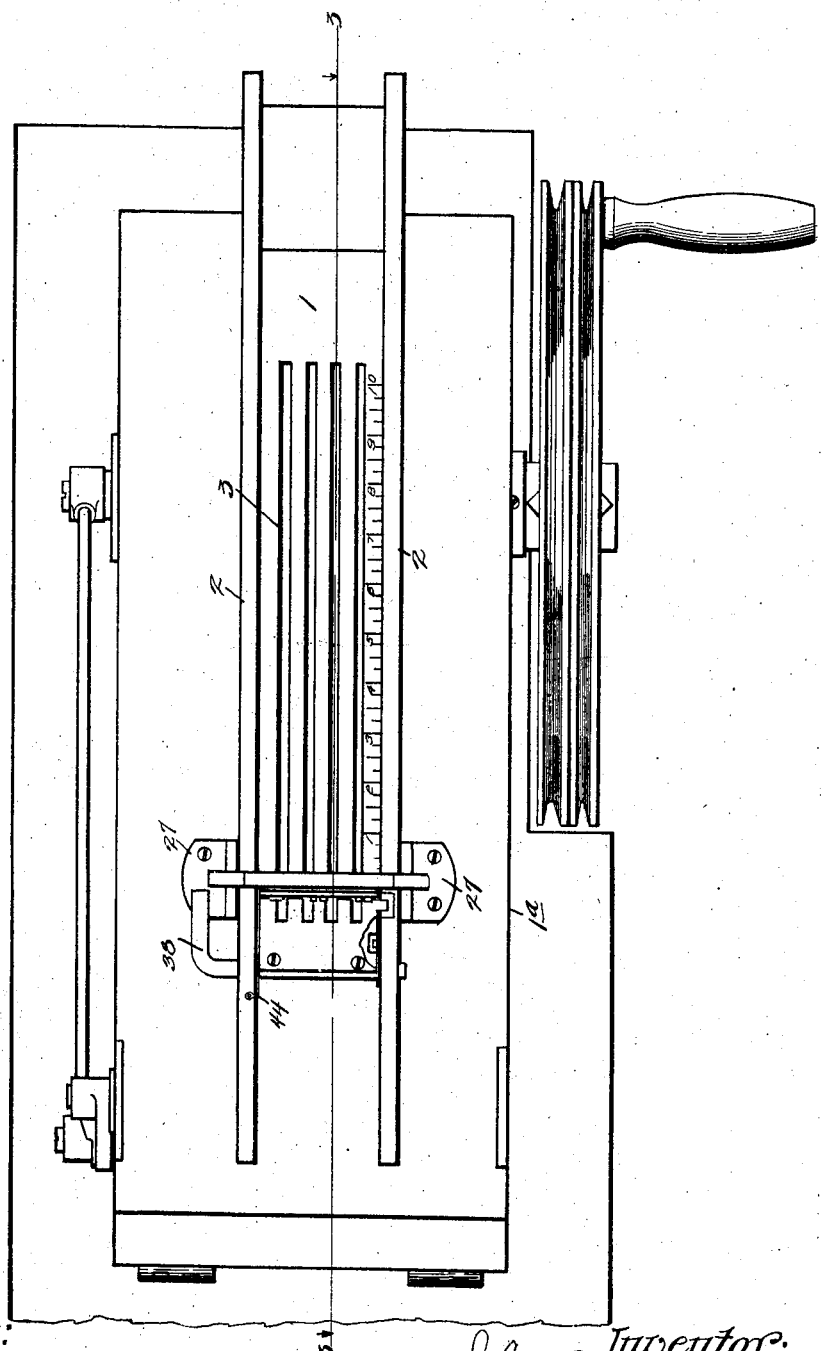

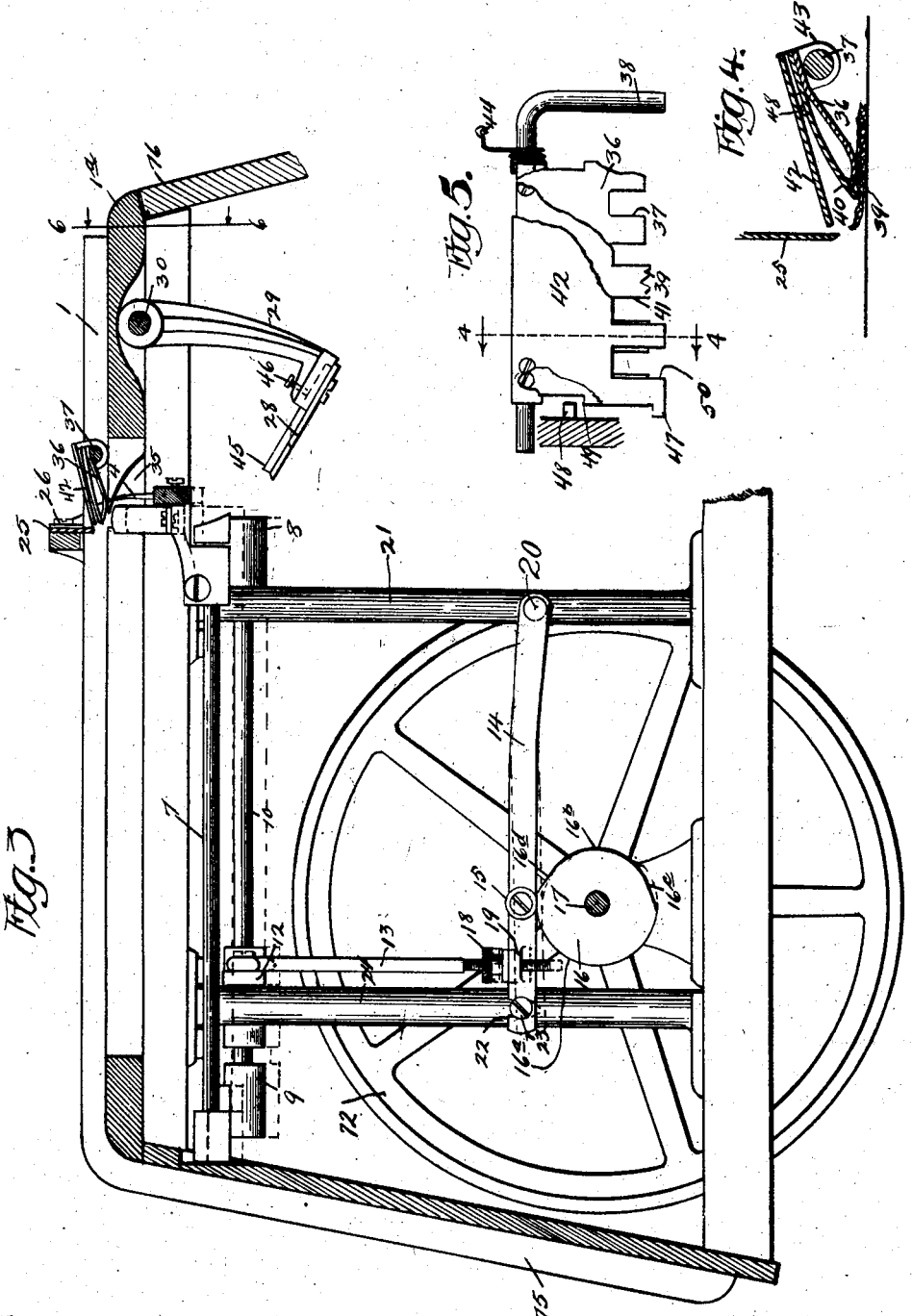

No. 760,760. PATENTED MAY 24, 1904.
J. A. RUSSELL.
MACHINE FOR CUTTING MANTLES FOR INCANDESCENT LIGHTS
OR OTHER MATERIAL.
APPLICATION FILED FEB. 11, 1903.
NO MODEL. 5 SHEETS—SHEET 4.

Witnesses:
Inventor:

No. 760,760. PATENTED MAY 24, 1904.
J. A. RUSSELL.
MACHINE FOR CUTTING MANTLES FOR INCANDESCENT LIGHTS
OR OTHER MATERIAL.
APPLICATION FILED FEB. 11, 1903.
NO MODEL. 5 SHEETS—SHEET 5.
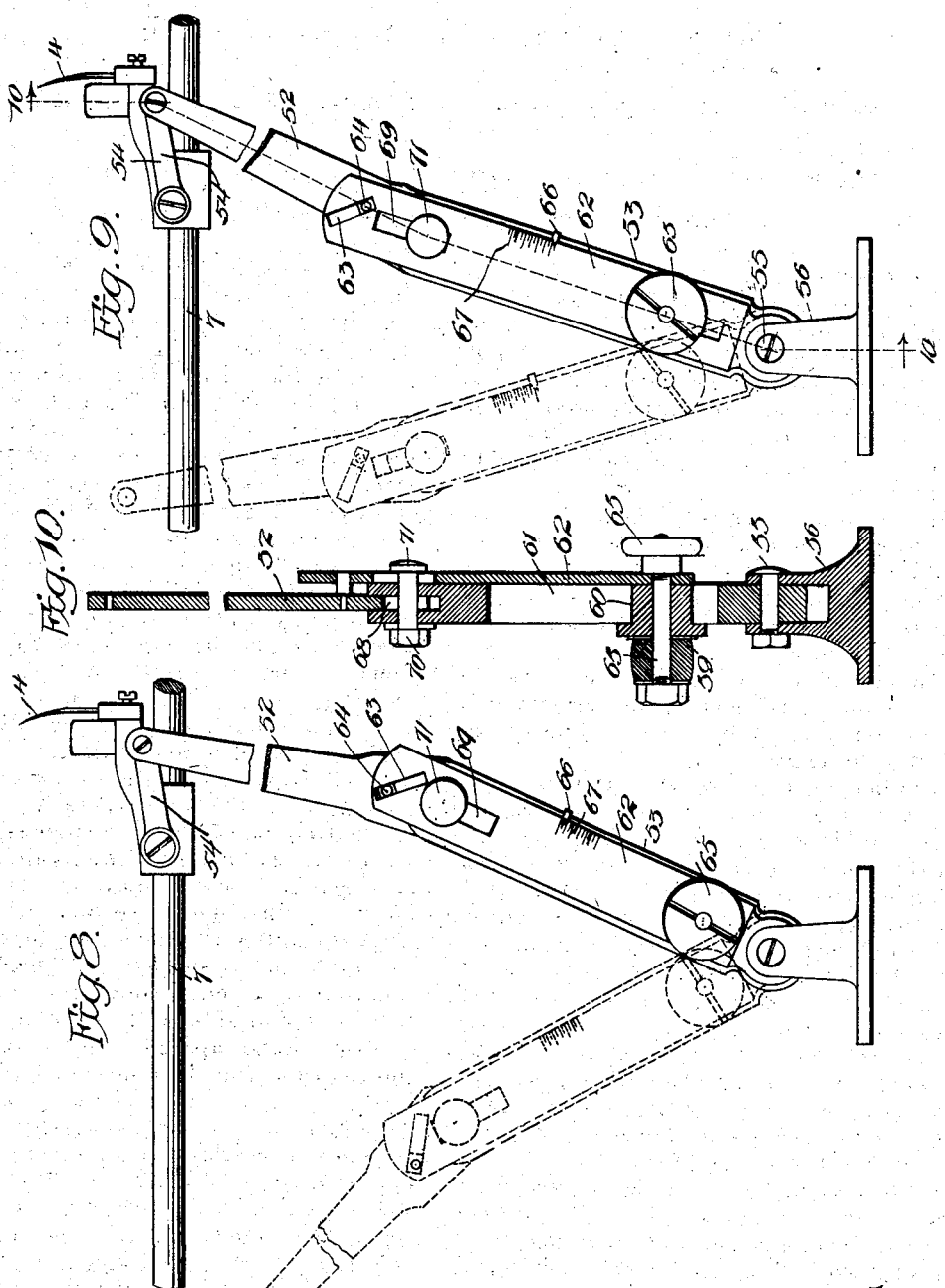

No. 760,760. Patented May 24, 1904.

UNITED STATES PATENT OFFICE.

JOHN A. RUSSELL, OF CHICAGO, ILLINOIS.

MACHINE FOR CUTTING MANTLES FOR INCANDESCENT LIGHTS OR OTHER MATERIAL.

SPECIFICATION forming part of Letters Patent No. 760,760, dated May 24, 1904.

Application filed February 11, 1903. Serial No. 142,939. (No model.)

*To all whom it may concern:*

Be it known that I, JOHN A. RUSSELL, a citizen of the United States, residing at Chicago, in the county of Cook and State of Illinois, have invented certain new and useful Improvements in Machines for Cutting Mantles for Incandescent Lights or other Material, of which the following is a full, clear, and exact specification.

My invention relates to machines for cutting strips of material into sections of uniform length, and more particularly to machines for cutting flexible strips of fabric, such as the knitted tubes from which incandescent mantles are produced.

The invention has for its primary object to provide improved means for automatically cutting strips of fabric into sections of predetermined length.

Another object of the invention is to provide a cutting-machine in which the feed shall be adjustable to vary the length of its stroke; but the commencement of the stroke shall always be from the same point, whereby the point of engagement with the goods will not vary, and hence the feed may be made to engage the goods at a point contiguous to the advance end regardless of the length of the stroke.

Another object of the invention is to sever the goods by shearing-blades intersecting the support on which the goods rest and across said support at a point intermediate the extremities of the stroke of the feed.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

Figure 6:
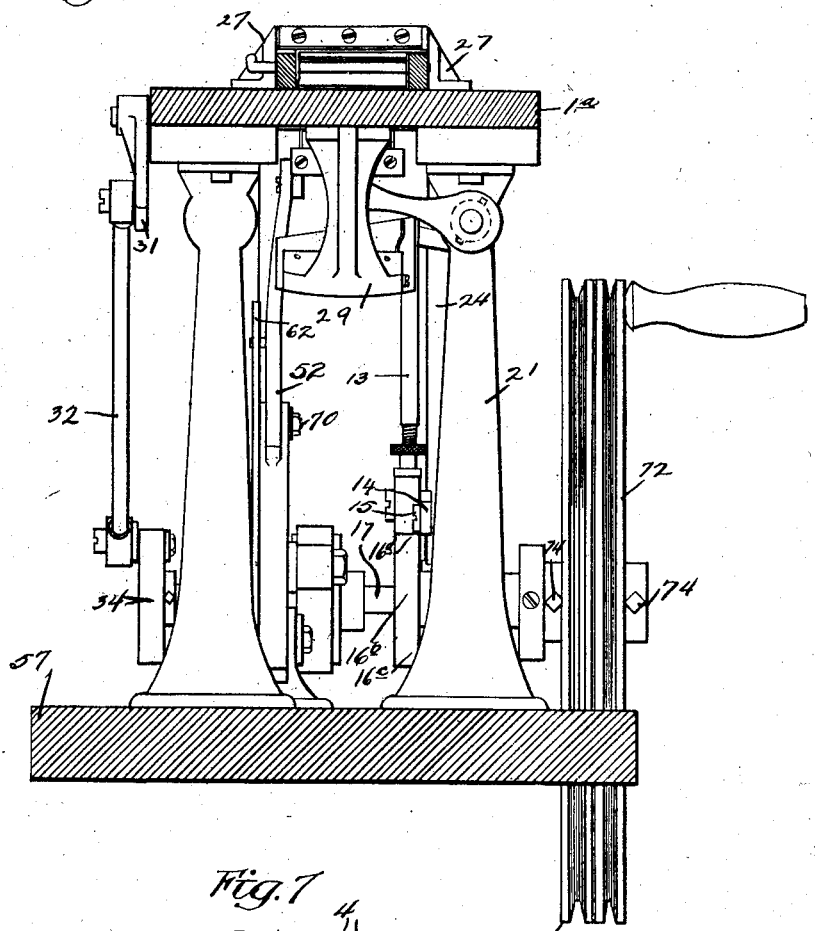
Figure 7:
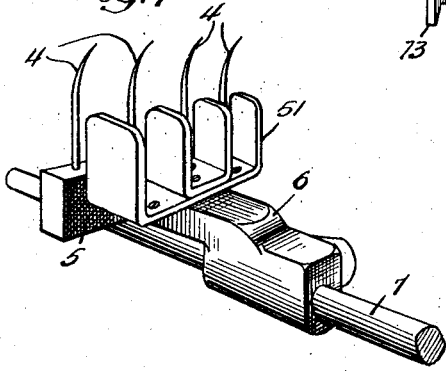

In the said drawings, Figure 1 is a side elevation of my improved machine. Fig. 2 is a plan view thereof. Fig. 3 is a vertical longitudinal section on the line 3 3, Fig. 2. Fig. 4 is a detail vertical sectional view of the pressers, showing the relation of the same to one of the shearing or cutter blades, taken on the line 4 4, Fig. 5. Fig. 5 is a plan view thereof. Fig. 6 is a vertical cross-section of the machine on the line 6 6, Figs. 1 and 3. Fig. 7 is a detail perspective view of the feeder hereinafter described. Fig. 8 is a detail side elevation of the feeder-actuating arm or lever, showing its relation to the feeder and adjusted to produce the maximum length of stroke. Fig. 9 is a similar view showing the device adjusted for producing the minimum length of stroke. Fig. 10 is a longitudinal sectional view taken on the line 10 10, Fig. 9.

As is well understood by those skilled in the art, mantles or incandescent lamps are produced by first weaving a tube of any suitable thread and then cutting the tube into sections of proper length, and subsequently treating them by the various processes for producing the non-combustible ash.

My invention as shown in the drawings is especially adapted for rapidly and accurately feeding this tube automatically past a suitable cutter; but it will nevertheless be understood that the invention is also applicable for cutting other material into sections of a given length. When employed for cutting incandescent mantles, the machine is provided with a suitable race or support for the goods or tubular strip, which is shown as comprising a bottom 1 and side walls 2, arranged at the proper distance apart for receiving and guiding the tube when flattened out. The bottom of the race is provided with a number of longitudinal slots 3, and projecting upwardly through these slots are a number of hooks or curved needles 4, which constitute parts of a feeder, which is shown in Fig. 7 as comprising a bar 5, in which the needles 4 are secured, and a sliding cross-head 6, which carries the bar 5 and is mounted on a longitudinal guide-rod 7, arranged lengthwise of the race and preferably below the bottom thereof. The bar or rod 7 is mounted at its ends in two rocker-arms 8 9, which are rigidly secured to a rocker-shaft 10, journaled in any suitable supports, such as standards 21 24 of the main frame, and the shaft 10 is provided with a crank-arm 12, pivotally secured to the upper end of an adjusting and supporting rod 13, whose lower end is supported upon a lever 14, having an antifriction-roller 15 resting upon a cam 16 on main shaft 17, and the cam 16 is formed with two concentric peripheries $16^a 16^b$, one of smaller diameter than the other, connected together by two straight portions $16^c$ $16^d$ and which are so proportioned and relatively arranged as to hold the needles 4 of the feeder in their elevated position projecting through the slots in the bottom of the race and in engagement with the goods throughout the length of their feeding stroke, the roller 15 during this time being supported by the larger concentric periphery $16^a$, and thereby holding the rod 7 at the limit of its upward movement; but when the feeder reaches the limit of its stroke on said rod 7 the roller 15 rides downwardly on one of the inclined or straight portions $16^c$ $16^d$ and thence rests on the smaller concentric periphery $16^b$ while the feeder is making its return stroke with the needles 4 out of engagement with the goods. In order, however, that the extent to which the needles penetrate the goods may be varied to suit the requirements, the rod 13 is made adjustable on the lever 14 by providing the rod with a set-screw 18, threaded thereon and passing through and resting upon a boss 19 on lever 14. Lever 14 may be supported and held in place in any suitable way. One end is shown as pivoted at 20 to standard 21, while the other end is slotted at 22 and fits under a headed guide-screw 23 on standard 24.

The cutter for severing the goods preferably consists of two shearing-blades, one of which is preferably fixed above the race, while the other moves upwardly into engagement therewith from below. The fixed blade is shown at 25 and is secured by screws 26 or other suitable devices to any suitable supports 27, mounted on table $1^a$, part of which constitutes the bottom of the race. The movable knife or blade is shown at 28 and preferably has a shearing or oblique edge, while the edge of blade 25 may be horizontal or parallel with the face of the race. The blade 28 is secured to a pivoted arm 29, rigidly mounted on a rocker-shaft 30, journaled under the table $1^a$. The outer end of shaft 30 is provided with a rocker-arm 31, as better shown in Fig. 1, which is operatively attached by connecting-rod 32 to a wrist-pin or other suitable crank 33 on disk 34, secured to shaft 17, so that at each rotation of the shaft the blade 28 will make its upward stroke to coöperate with blade 25 in severing the goods. The cutting edge of blade 25 is located a slight distance above the face of the race, and the blade 28 intersects the race, passing upwardly in so doing through a transverse slot 35, severing the bars or portions of the race between the longitudinal slots 3 in the bottom of the race at a point just back of the blade 25. The goods to be cut into sections are fed along the race from the right-hand end, as shown in Fig. 3, and the knife severs the same at a time when the needles of the feeder are at the left-hand end of their stroke, thus leaving the forward end of the main portion of the goods behind the blade 25, to which point the needles of the feeder must return and rise upwardly through the race in order to again engage the goods for pulling the same forward the proper distance before the movable blade of the cutter again comes into operation. Consequently the edge of the blade 25 is located sufficiently high above the race to avoid being engaged by the needles, and in order that the goods may be held down against the race while the needles are rising into engagement therewith, so as to insure the penetration of the goods by the needles, I provide a presser, preferably consisting of a shoe 36, extending across the race and secured to a pivoted rocker-shaft 37, journaled in the side walls of the race and having a weighted handle 38, which tends to hold the shoe 36 yieldingly against the goods, the shoe being provided with slots 37 for the passage of the needles 4.

In order that the goods may not undergo a retrograde or backward movement when the mantle is severed from the end thereof and before the needles again engage the same, the presser 36 is provided at its forward edge with a number of teeth 39, which project downwardly therefrom a sufficient distance into the goods to hold the same from slipping backwardly until the needles rise. These teeth 39 are shown as formed on a plate 40, which is separate from the plate or presser 36 and is also secured to the shaft 37 and movable in unison with the presser 36 and virtually a part thereof. The plate 40 is also slotted, as shown at 41, for the passage of the needles 4. When the movable blade 28 rises and severs the fabric, it pushes the end thereof upwardly considerably above the lower edge of blade 25, and in order to insure against such end curling up in front of teeth 39 and engaging the side of blade 25 without passing freely thereunder a second presser 42 is employed and arranged, preferably, directly above the first-described presser as close to the blade 25 as possible without combining thereagainst, while being at the same time pivoted to swing on an arc. This presser 42 is preferably pivotally mounted upon the shaft 37 by means of arms 43, but is independent of said shaft and of the presser 36, so that it may move upwardly with the blade 28 without interfering with the position of presser 36. The presser 36 is held down by gravity, as before described; but the presser 42 is preferably pressed downwardly by means of spring 44. In order that the presser 42 may rise out of the way of the blade 28 when the latter ascends, the arm 29, which carries said blade, is provided with an adjustable rod 45, secured in the arm in any suitable way, as by means of set-screw 46, and adapted to strike a lug 47 on the side of presser 42 as soon as the upper corner of blade 28 reaches the blade 25, the time at which the presser 42 begins to rise being regulated by the adjustment of the rod 45. The normal position of the presser 42 is such that its edge is just below the edge of blade 25, so that as the fabric is pulled forward by needles 4 the advance edge of the fabric will be smoothed out and guided under the blade. The presser 42 is held in this normal position and prevented from descending too far by any suitable stop 48, projecting from one of the side walls 2 of the race, the plate 40 and shoe or presser 36 being notched at 49, so as to pass stop 48, should it be desired to elevate them in inserting the end of the goods to a position where the same may be engaged by the feeder, it being understood that both pressers may be thus elevated simultaneously by the handle or lever 38. The presser 42 may also, if desired, be provided with slots 50, registering with the slots in the presser 36 and plate 40, for the passage of the needles 4.

In order to insure against the possibility of the needles 4 getting out of line with the slots 3 in the bottom of the race where the race is intersected by the cutter, the cross-head 6 or some other suitable part of the feeder is provided with a number of guide-plates 51, located in line with and in advance of the needles 4 and which are so positioned that they do not entirely cross the slot 35, but remain between the longer ends of the bars of the slotted race.

The feeder is reciprocated on its guide rod or bar 7 by means of a pivoted arm or lever, preferably consisting of two jointed members 52 53, the upper one of which is connected by a link 54 to the side of the sliding cross-head 6, while the lower member 53 is pivoted at 55 in a suitable support 56, mounted on a base 57, upon which the balance of the mechanism is also supported. This jointed arm or lever is oscillated by an eccentric 58 or any other suitable connection with driving-shaft 17, whose strap is connected by rod 59 to a stud 60, fitting in a slot 61 in member 53, so that by changing the position of the stud 60 with reference to the length of member 53 the length of the stroke of the feeder may be accordingly varied, thereby providing means for cutting off sections for mantles of various lengths. Inasmuch, however, as the feeder must always start from the same point with reference to the length of the race, I provide means whereby the variation in the length of the feeding stroke does not vary the initial position of the feeder, or, in other words, the movement of the stud 60 in the slot 61 does not alter the position of the upper end of the jointed arm where it is connected to the feeder. An efficient and simple means for accomplishing this will now be described. As shown in Figs. 8 to 10, the arm or lever member 53 is provided on one side with a slide 62, whose upper end is provided with an oblique slot 63, engaging over a stud or pin 64 on the arm member 52. This slot 63 is arranged approximately at an angle of forty-five degrees to the longitudinal axis of slide 62, and the slide is preferably connected with the stud 60 by any suitable means, such as set-screw 65, which also serves as a pivot for rod 59, so that when the slide is moved in one direction for altering the position of stud 60 in slot 61 the two members 52 53 of the arm or lever will be simultaneously turned at an angle to each other a degree proportionate to the distance which the stud 60 is moved along slot 61, the slot 63 serving more as a means of permitting the arm member 53 to move at its upper end to accommodate stud 60 without moving the upper end of arm member 52 than as a means of contributing to this movement. The distance which the stud 60 is to be moved in the slot 61 for producing any predetermined length of feed may be determined by providing the arm member 53 with an index or pointer 66 and the slide 62 with suitable graduations 67, representing inches or fractions thereof.

The jointed connection between the arm members 52 53 is of a slidable character, so as to allow the arm members to move relatively without pulling the upper member downwardly. Hence the lower end of arm member 52 is slotted at 68, and passing through this slot and also through member 53 and a longitudinal slot 69 in slide 62 is a pivoted bolt 70, whose head 71 serves to hold slide 62 in place.

The driving-shaft 17 may be driven in any suitable way. I have shown it provided with a hand-wheel 72 and a belt wheel or pulley 73, both detachably secured by screws 74 to the shaft, so that either may be used.

The sections of the fabric severed from the main piece fall from the end of the race down a suitable chute 75, and, if desired, the opposite end of the base 57 may be provided with a folding extension 76, upon which lies the main piece of the fabric being cut.

Having thus described my invention, what I claim as new therein, and desire to secure by Letters Patent, is—

1. In a machine for the purpose described the combination of a race for the goods having a longitudinal slot, a feeder traversing said slot and adapted to engage the goods in said race, and a cutter intersecting said race at a point intermediate the extremities of the stroke of said feeder.

2. In a machine for the purpose described the combination of a race for the goods having a longitudinal slot, a feeder traversing said slot and adapted to engage the goods in said race, a cutter intersecting said race at a point intermediate the extremities of the stroke of said feeder, and a presser contiguous to said cutter for holding the goods against the race.

3. In a machine for the purpose described the combination of a race for the goods having a longitudinal slot, a feeder traversing said slot and adapted to engage the goods, a cutter intersecting said race at a point intermediate the extremities of the stroke of the feeder, comprising two blades one of which is arranged across the race and means for directing the goods past the edge of said blade.

4. In a machine for the purpose described the combination of a race for the goods, a feeder traversing said race and adapted to engage the goods, a cutter intersecting said race at a point intermediate the extremities of the stroke of the feeder, comprising two blades one of which is arranged across the race, and a presser contiguous to said blade at a point intermediate the extremities of the stroke of the feeder.

5. In a machine for the purpose described the combination of a race for the goods, a feeder traversing said race and adapted to engage the goods, a cutter intersecting said race at a point intermediate the extremities of the stroke of said feeder, and a slotted presser contiguous to the cutter for holding the goods against the race.

6. In a machine for the purpose described the combination of a race for the goods, a feeder traversing said race and adapted to engage the goods, a cutter intersecting said race and comprising a blade projecting across the race at a distance therefrom, a presser for directing the goods across the edge of said blade, movable toward and from the face of the race, and a stop for limiting the movement of said presser toward the race.

7. In a machine for the purpose described the combination of a race for the goods, a feeder traversing said race and adapted to engage the goods, a cutter for severing the goods on said race, and two pressers arranged one above the other above the race and independent of each other.

8. In a machine for the purpose described the combination of a race for the goods, a feeder traversing said race and adapted to engage the goods, a cutter for severing the goods on the race and two independent pressers for forcing the goods toward the race arranged one above the other and having registering slots.

9. In a machine for the purpose described the combination of a race for the goods, a feeder traversing said race and adapted to engage the goods, a cutter comprising two blades one of which is movable toward and across the race, two pressers for forcing the goods toward the race, and means for raising one of said pressers by the movement of said movable blade.

10. In a machine for the purpose described the combination of a race for the goods, a feeder traversing said race and adapted to engage the goods, a cutter comprising two blades one of which is movable toward and across the race, two pressers for forcing the goods toward the race, and adjustable means for raising one of said pressers by the movement of said movable blade.

11. In a machine for the purpose described the combination of a race for the goods, a feeder traversing said race and adapted to engage the goods, a cutter for severing the goods on the race, two pressers arranged one above the other for pressing the goods toward the race and means for raising both of said pressers simultaneously.

12. In a machine for the purpose described the combination of a race for the goods, a feeder traversing said race and adapted to engage the goods, a cutter having a blade extending across said race, a presser having a slotted shoe for receiving said feeder and for holding the goods against the race and a toothed member arranged over said shoe and projecting beyond the edge thereof for also engaging the goods and holding the latter against backward movement.

13. In a machine for the purpose described the combination of a race for the goods, having a longitudinal slot, a feeder movable upwardly through and traversing said slot and adapted to engage the goods, a guide-plate movable with said feeder in said slot and a cutter intersecting said slot and race.

14. In a machine for the purpose described the combination of a race for the goods, a cutter intersecting said race, a feeder adapted to engage the goods movable lengthwise of the race, a bar extending longitudinally of the race and upon which said feeder slides and means for raising and lowering said bar at the commencement and conclusion respectively of each stroke of the feeder.

15. In a machine for the purpose described the combination of a race for the goods, a cutter extending across said race, a feeder adapted to engage the goods, a bar extending longitudinally of the race and upon which said feeder slides, means for raising and lowering said bar at the commencement and conclusion respectively of each stroke of the feeder, and means for varying the initial height of said bar with reference to the race whereby the extent to which the feeder enters the goods may be varied.

16. In a machine for the purpose described the combination of a race for the goods, a cutter extending across said race, a feeder adapted to engage the goods, a bar extending longitudinally of the race and upon which said feeder slides, a driving-shaft operatively connected with said cutter and feeder, crank-arms in which said bar is mounted, a cam on said shaft and an adjustable connection between said cam and crank-arms whereby said bar is raised and lowered and its initial position adjusted.

17. In a machine for the purpose described the combination of a race for the goods, a cutter for severing the goods, a rod extending longitudinally of the race, means for raising and lowering said rod, a feeder for the goods sliding on said rod and a link connecting said arm with said feeder for reciprocating it.

18. In a machine for the purpose described the combination of a support for the goods, a feeder for advancing the goods along said support, a two-part jointed arm or lever for reciprocating said feeder, means for imparting a variable degree of oscillation to said arm or lever and means for adjusting the joint of said arm laterally relatively to the feeder without changing the position of the feeder.

19. In a machine for the purpose described the combination of a support for the goods, a feeder for advancing the goods along said support, a two-part jointed arm for reciprocating said feeder, means for imparting a variable degree of oscillation to said arm and means for adjusting the joint of said arm relatively to the feeder in both directions and in the line of oscillation of said arm, without changing the position of the feeder.

20. In a machine for the purpose described the combination of a support for the goods, a feeder for advancing the goods along said support, a two-part jointed arm for reciprocating said feeder, means for imparting a variable degree of oscillation to said arm and means connected with said arm oscillating means for adjusting the joint of said arm relatively to the feeder and in a direction transverse to the arm.

21. In a machine for the purpose described the combination of a support for the goods, a feeder for advancing the goods along said support, a two-part jointed arm for reciprocating said feeder pivotally fixed at one end and operatively connected at the other end to said feeder and means for holding the joints or parts of said arm against relative movement at various angles to each other.

22. In a machine for the purpose described the combination of a support for the goods, a feeder for advancing the goods along said support, a two-part jointed arm for reciprocating said feeder, pivotally fixed at one end and operatively connected at the other end to said feeder, a slide movable lengthwise of one part of said arm and provided with an oblique slot-and-pin connection with the other part of said arm and means for clamping the said slide at the desired adjustment.

23. In a machine for the purpose described the combination of a support for the goods, a feeder for advancing the goods along said support, a two-part jointed arm for reciprocating said feeder, pivotally fixed at one end and operatively connected at its other end to said feeder, a slide movable lengthwise of one part of said arm and having oblique pin-and-slot connection with the other part of said arm and means for oscillating said arm movable in unison with said slide lengthwise of the arm.

24. In a machine for the purpose described the combination of a support for the goods, a feeder for advancing the goods along said support, a two-part jointed arm for reciprocating said feeder pivoted at one end and operatively connected at the other end to said feeder, one member of said arm being slotted, means for oscillating said arm comprising a stud arranged in said slot, a slide movable lengthwise of said slotted member and having oblique slot-and-pin connection with the other member of said arm and a clamp for securing said stud, slide and slotted arm member together.

25. In a machine for the purpose described the combination of a support for the goods, a feeder for advancing the goods along said support, a two-part jointed arm for reciprocating said feeder pivoted at one end, a link pivotally connecting the other end of said arm to said feeder, a slide carried by one member of said arm and movable longitudinally thereof and having oblique slot-and-pin connection with the other member of said arm and means for oscillating said arm connected with said first member thereof.

JOHN A. RUSSELL.

Witnesses:
F. A. HOPKINS,
M. B. ALLSTADT.